United States Patent
Shyr

(10) Patent No.: US 6,954,354 B2
(45) Date of Patent: Oct. 11, 2005

(54) PROTECTING DEVICE OF COMPUTER DATA-ACCESSING DEVICE

(75) Inventor: Daniel Shyr, Taipei (TW)

(73) Assignee: Avance Technologies Inc., Taipei (TW)

( * ) Notice: Subject to any disclaimer, the term of this patent is extended or adjusted under 35 U.S.C. 154(b) by 126 days.

(21) Appl. No.: 10/403,381

(22) Filed: Apr. 1, 2003

(65) Prior Publication Data

US 2003/0193774 A1 Oct. 16, 2003

(51) Int. Cl.$^7$ ................................................ G06F 1/16
(52) U.S. Cl. ...................... 361/683; 361/685; 361/695; 312/223.1
(58) Field of Search ........................ 361/683, 685, 361/724–727, 730, 732, 801, 816, 747, 752; 312/223.1, 223.2; 248/220.21, 220.22; 16/231, 232, 221, 230; 49/407, 381, 336; 29/80, 81, 87; 429/97, 100; 220/810, 817, 843, 844

(56) References Cited

U.S. PATENT DOCUMENTS

| | | | | |
|---|---|---|---|---|
| 5,717,570 A | * | 2/1998 | Kikinis | 361/685 |
| 5,815,379 A | * | 9/1998 | Mundt | 361/683 |
| 5,926,916 A | * | 7/1999 | Lee et al. | 16/230 |
| 6,000,769 A | * | 12/1999 | Chen | 312/223.2 |
| 6,062,663 A | * | 5/2000 | You et al. | 312/223.2 |
| 6,130,822 A | * | 10/2000 | Della Fiora et al. | 361/724 |
| 6,157,540 A | * | 12/2000 | Eddings et al. | 361/727 |
| 6,163,431 A | * | 12/2000 | Fleckenstein et al. | 360/92 |
| 6,236,564 B1 | * | 5/2001 | Fan | 361/695 |
| 6,411,506 B1 | * | 6/2002 | Hipp et al. | 361/686 |
| 6,595,605 B1 | * | 7/2003 | Babcock et al. | 312/223.2 |
| 6,628,512 B2 | * | 9/2003 | Searby et al. | 361/683 |
| 2001/0046118 A1 | * | 11/2001 | Yamanashi et al. | 361/687 |

* cited by examiner

Primary Examiner—Michael Datskovskiy

(57) ABSTRACT

A protecting device of a computer data-accessing device is disclosed. The machine frame is installed with a front surface corresponding to the data-accessing device. The front surface has a movable door. Pivotal portions are installed at the front surface. The frame has a lock for locking the door. Therefore, by the pivotal connection of the pivotal portions and the machine frame, the lock is used as an openable free end. By the locking relation of the lock and the machine frame, the door can be opened or closed. When the door is opened, the hard disk can be drawn out, and when the door is closed, the hard disk drive will not fall down, or is not intruded by other objects. Moreover, another side of the machine frame is installed with an openable fan device so that the hard disk drive has a preferred heat dissipating effect.

6 Claims, 7 Drawing Sheets

PROTECTING DEVICE OF COMPUTER DATA-ACCESSING DEVICE

FIELD OF THE INVENTION

The present invention relates to computer peripherals, and particularly to protecting device of a computer data-accessing device.

BACKGROUND OF THE INVENTION

Conventionally, hard disk drives are fixed to the casings of computers. Although this design has preferred stability, with the improvement of technology and update of products, plug-in hard disk drives are developed and thus the hard disk drives are portable. The repair work can be performed conveniently.

In general, plug-in hard disk drives have some buckling structures for fixing the hard disk drives in the machine frame. It is possible that these buckles will release or fall during transfer and assembly process. Moreover, for being drawing out conveniently, the front surface of the fixed machine frame has an opened design so that electromagnetic wave easily leaks out.

SUMMARY OF THE INVENTION

Accordingly, the primary object of the present invention is to provide protecting device of a computer data-accessing device, wherein a movable door for shielding the hard disk drive is designed. If it is necessary to draw the hard disk drive out of the machine frame, it is only necessary to open the door conveniently and the door will prevent the hard disk drive from fall out. Moreover, outer objects will not intrude into the machine frame and the door can prevent the leakage of electromagnetic wave.

To achieve above object, the present invention provides a protecting device of a computer data-accessing device. The machine frame is installed with a front surface corresponding to the data-accessing device. The front surface has a movable door. Pivotal portions are installed at one lateral side of the front surface for being pivotally installed to the machine frame. The frame has a lock for locking the door. Therefore, by the pivotal connection of the pivotal portions of the door and the machine frame, one end of the lock is an openable free end. By the locking relation of the lock and the machine frame, the door can be opened or closed. When the door is opened, the hard disk can be drawn out, and when the door is closed, the hard disk drive will not fall down, or is intruded by other objects. Moreover, electromagnetic wave will not leak out. Another side of the machine frame is installed with an openable fan device so that the hard disk drive has a preferred heat dissipating effect.

The various objects and advantages of the present invention will be more readily understood from the following detailed description when read in conjunction with the appended drawing.

DETAILED DESCRIPTION OF THE PREFERRED EMBODIMENTS

Figure 1:
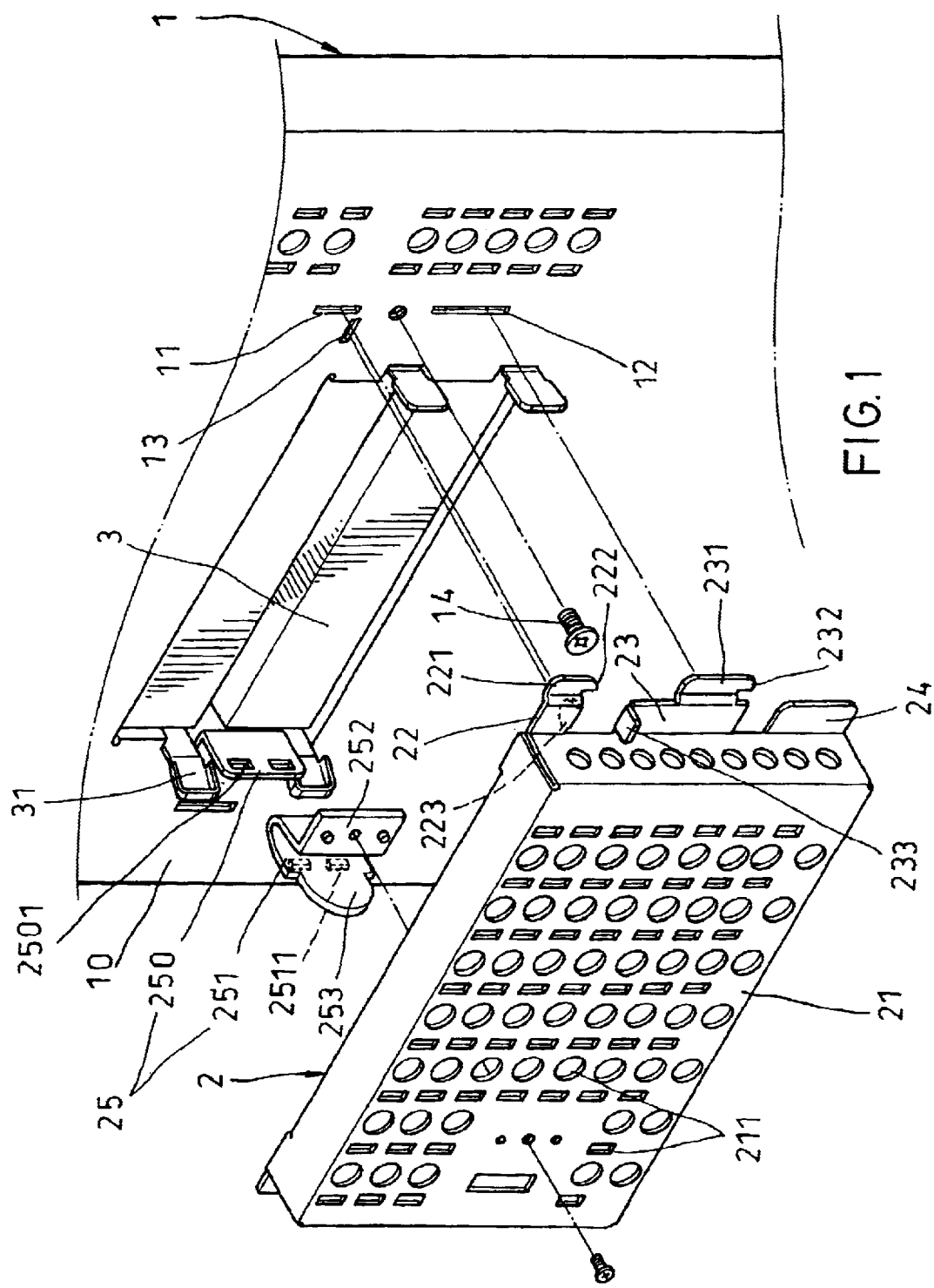
FIG. 1 is an exploded view showing that the door of the present invention is installed to a machine frame.
Figure 2:
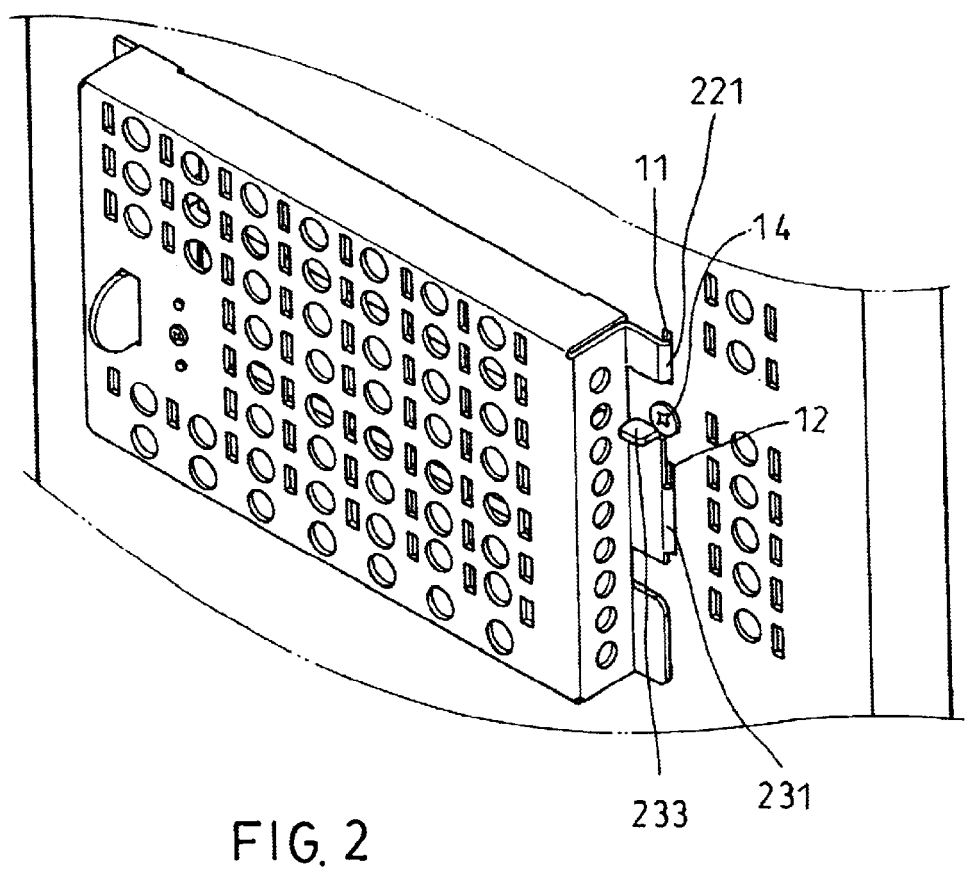
FIG. 2 is a schematic view of FIG. 1.
Figure 3:
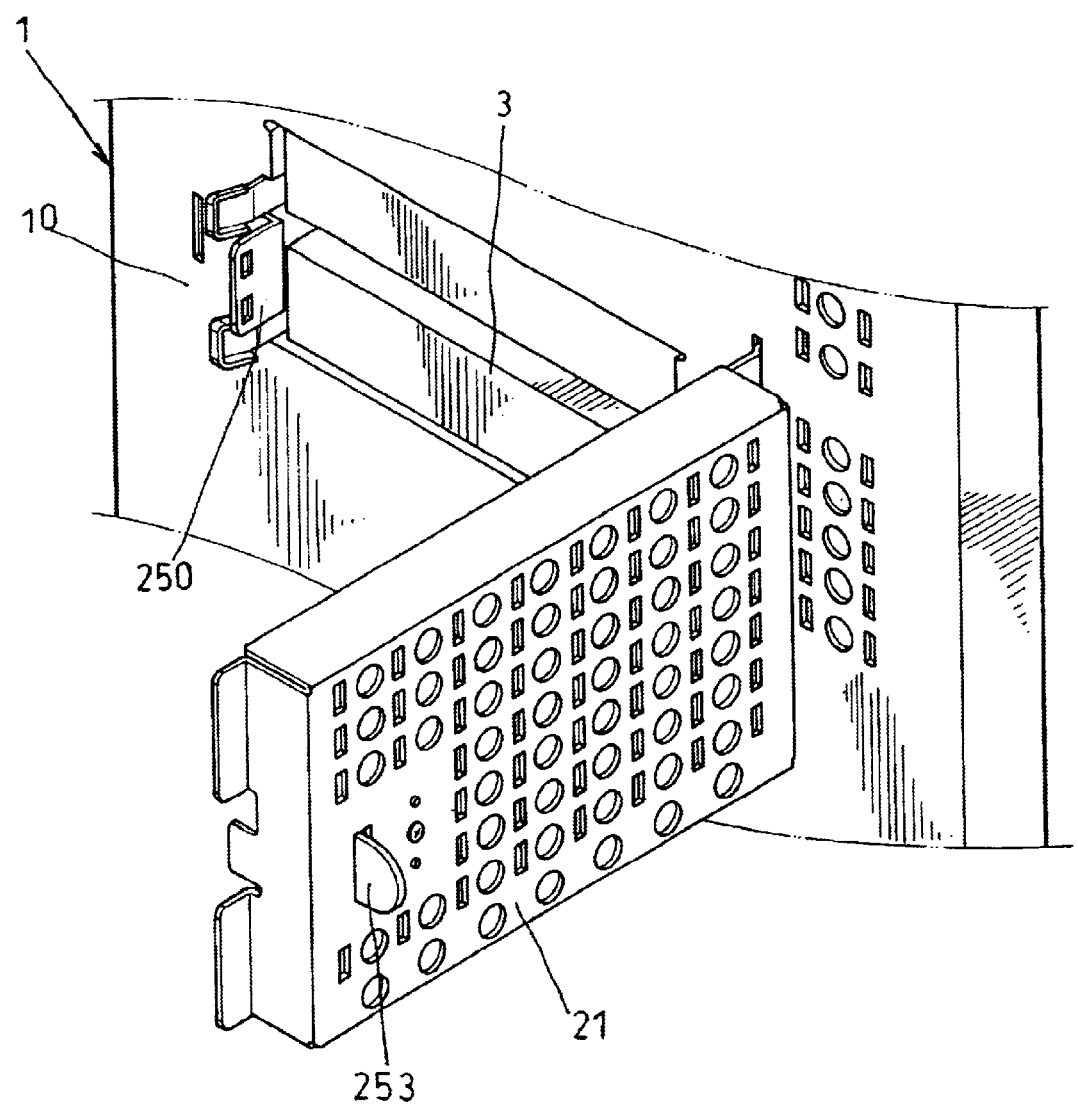
FIG. 3 is a schematic view showing that the door is opened.

In general, a machine frame 1 is used to install various components. Referring to FIG. 1, in the present invention, the machine frame 1 is installed with a front surface 10 corresponding to a data-accessing device. The front surface 10 has a movable door 2. In the embodiment illustrated in the figure, the data-accessing device is a plug-in hard disk drive 3. As shown in the figure, the movable door 2 includes a door body 21 with a rectangular door body. One lateral side of the door 21 has a plurality of extending pieces 22, 23 and 24. At least two extending pieces 22 and 23 have pivotal portions 221 and 231 at the outer lateral side thereof for being pivotally installed to the machine frame 1. The machine frame 1 has a lock 25 for locking the door 2. Therefore, by the pivotal connection of the pivotal portions 221 and 231 of the door 2 and the machine frame 1, one end of the lock 25 is an openable free end, as illustrated in FIGS. 2 and 3.

By the locking relation of the lock 25 and the machine frame 1, the door 2 can be opened or closed. When the door 2 is opened, the hard disk 1 can be drawn out, and when the door 2 is closed, the hard disk drive will not fall down, or is intruded by other objects. Moreover, electromagnetic interference can be avoided.

Figure 4:
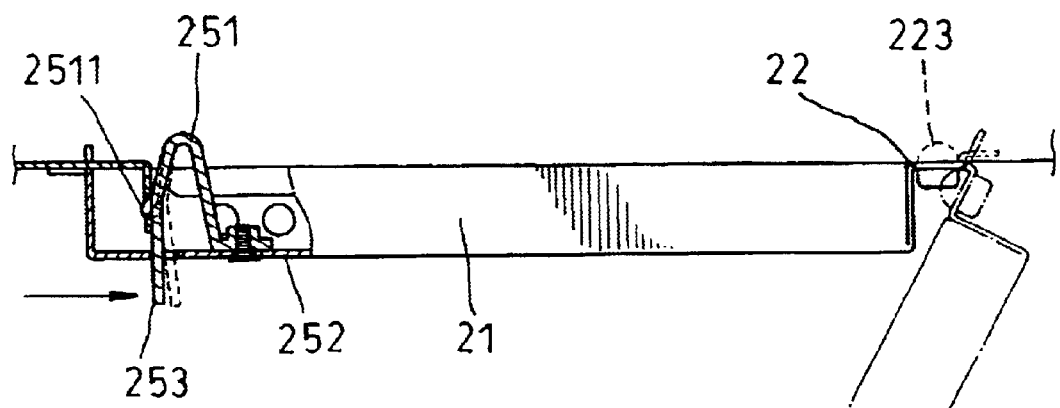
FIG. 4 is structural view showing the operation of FIG. 3.
Figure 5:
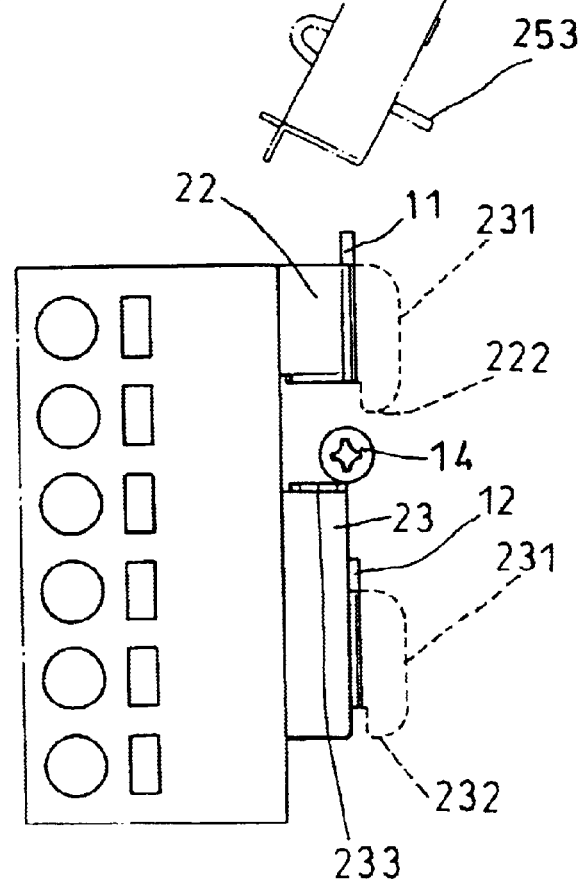
FIG. 5 shows that one side of the door is pivotally connected to the machine frame.

In detail, the pivotal relation of the door 2 and the machine frame 1 is stable. In the embodiment of the present invention, the pivotal portions 221 and 231 are cambered pieces. Lower portions of these pieces are extended with nose portions 222, 232. The pivotal portions 221 and 231 can be inserted into the inserting holes 11 and 12 of the machine frame 1 and then the nose portions 222, 232 move downwards to resist against the lower edges of the inserting holes 11 and 12. To avoid the shaking of the door 2 when the door 2 is positioned, one extending piece 22 is horizontally protruded with a first positioning piece 223. Referring to FIG. 4, the positioning piece 223 will insert into a connecting hole 13 in the machine frame 1 when the door 2 is closed so that the door 2 will not shake. Furthermore, a control element (14, a screw as illustrated) can be locked to the machine frame 1 in advance, the extending piece 23 corresponding to the control element 14 is protruded with a horizontal second positioning piece 233 which extends to a side away from the machine frame 1. In normal condition, the second positioning piece resists against the control element 14 so that the door 2 will not release along a direction opposite the nose portions 222, 232, as illustrated in FIG. 5. For the lock 25 of the door 2, the door 2 has an elastic piece 251 for generating elasticity as the door moves and a buckle 250 at one side of a hard disk drive moves away from the inserting holes of the machine frame 1. One end of the elastic piece 251 is extended with a connecting plate 252 which is connected to the door 2 at the side of the door 2 facing the machine frame 1. Another end of the elastic piece 251 passes through the door 2 and then is formed with a handle 253 protruded from the door 2 and serving for moving the elastic piece 251. The elastic piece 251 is formed with a buckling tip 2511 facing the buckle 250 and at the same horizontal surface of the elastic piece 251. When it is desired to close the door 2, it is only necessary to release the handle 253, so that the elastic piece 251 moves toward the buckle 250. Then the buckling tip 2511 will fall into the buckling hole 2501 of the buckle 250 so that the door 2 is not opened outwards. Moreover, it is only necessary to move the handle 253 of the elastic piece 251 so that the buckling tip 2511 releases from the buckling hole 2501, and then the door 2 will be opened (referring to FIG. 4). Thereby, the hard disk drive 3 may be pulled out or placed into the tracks 31 at the lateral sides of the machine frame 1. A plurality of holes 211 are installed on the door 2 for installing locks or indicating lamps so that the user may know the condition of the hard disk drive.

Figure 6:
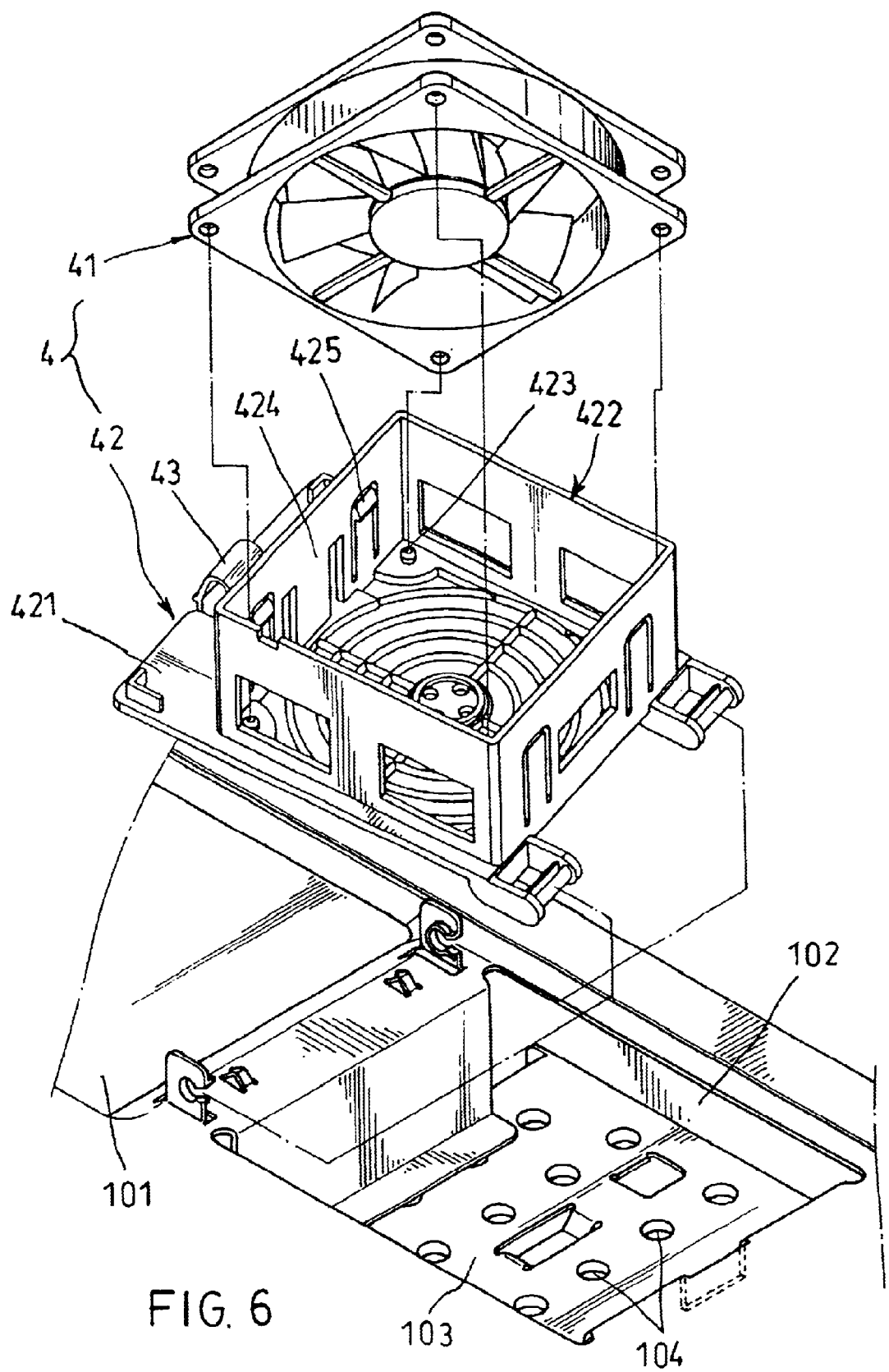
FIG. 6 is an exploded perspective view of the fan device of the present invention.
Figure 7:
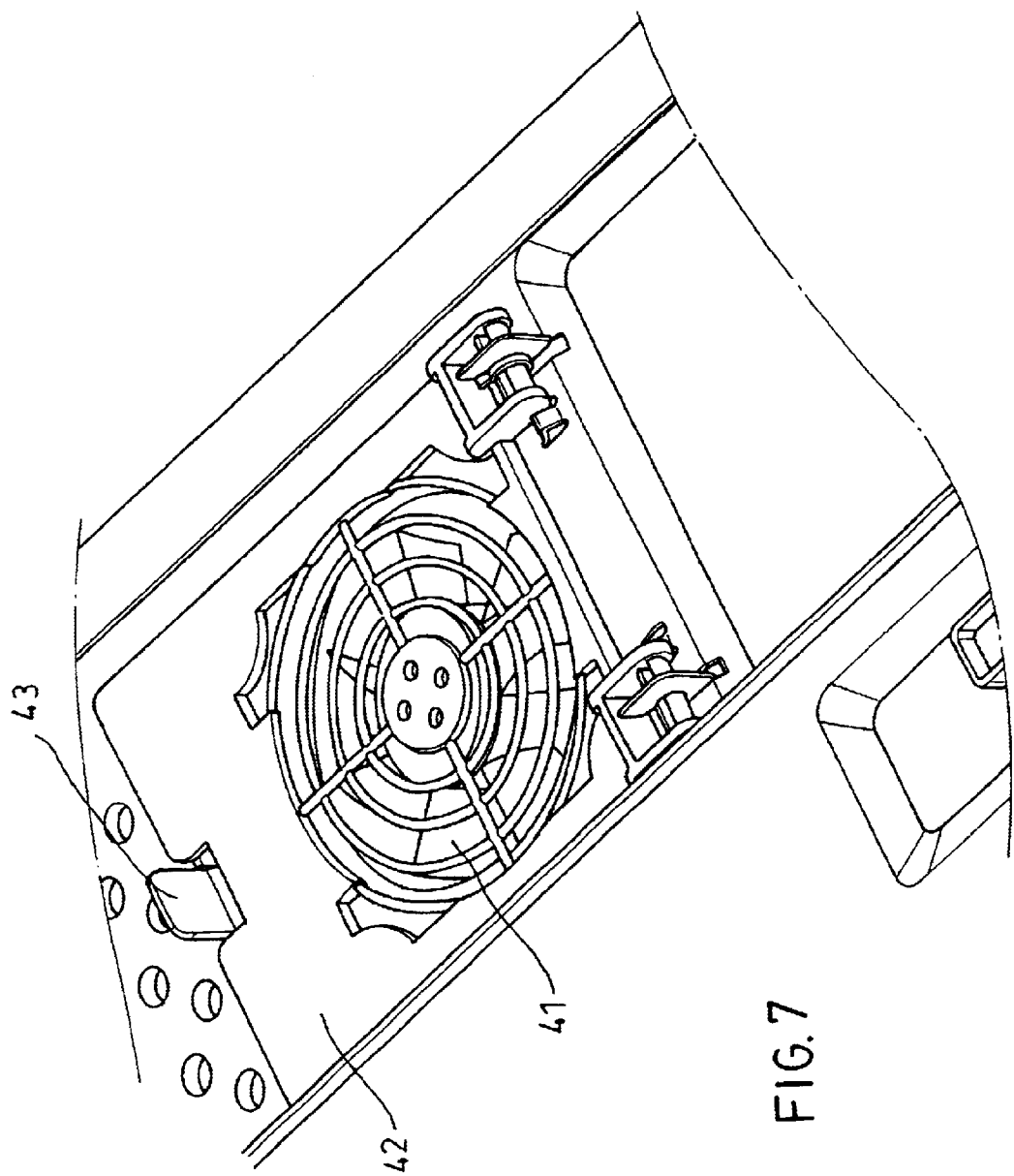
FIG. 7 is an assembled view of the fan device of the present invention.
Figure 8:
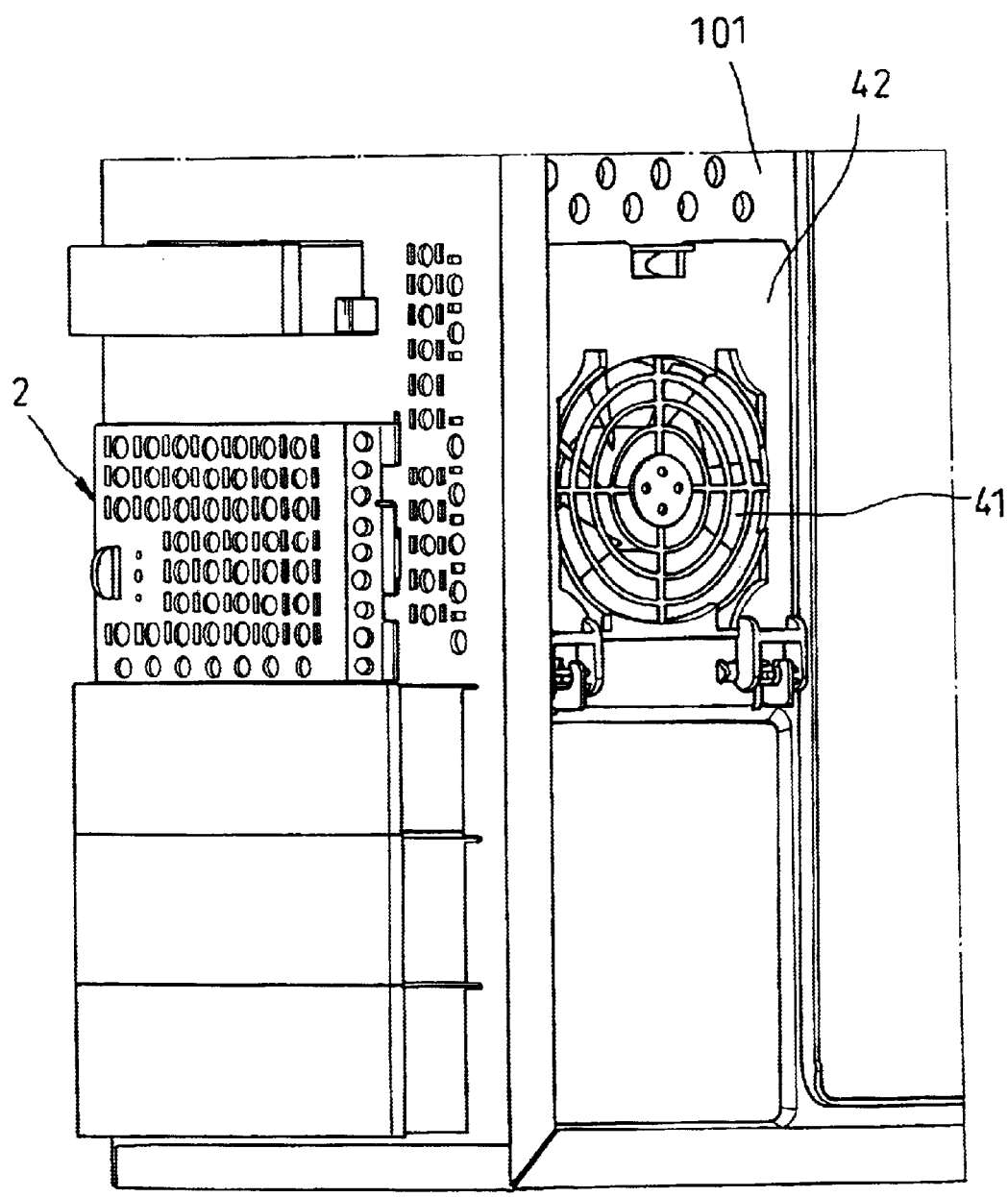
FIG. 8 shows that a fan device can be installed at another lateral side of the machine frame.

With reference to FIGS. 6 to 8, to increase the heat dissipating effect of the hard disk drive 3, a fan device 4 can be installed at another lateral side 101 of the machine frame 1 (referring to FIG. 8), and the fan device 4 is openable as illustrated in the FIG. 6 for being repaired. Thereby, the surface of the machine frame 1 installed with the fan device is installed with a receiving chamber 102 for embedding the fan 41 so as to form a flat surface on the machine frame 1. A bottom 103 of the receiving chamber 102 is formed with a plurality of vents 104. As a result, wind from the fan 41 can pass through the vents 104 to the machine frame 1 installing the hard disk drive 3.

The fan device 4 includes at least one fan 41 and an openable plate 42 for installing the fan 41. One side of the openable plate 42 is pivotally connected to the surface 101 of the machine frame 1 so that the openable plate 42 is freely openable. At the surface 421 of the openable plate 42 facing the receiving chamber 102 is installed with a frame body 422 having the fan 41. A bottom of the frame body 422 is installed with a positioning portion 423 for fixing the fan 41 or the surface of the frame body 424 is installed with an elastic hook 425 for preventing the frame body 424 from falling down. Besides, a lock portion 43 is installed at a side opposite to the pivotal connection of the openable plate 42 and the machine frame 1. The locking portion 43 is a bent elastic piece. By the locking portion 43, when the openable plate 42 is closed, the machine frame 1 is resisted (referring to FIG. 7). If it is desired to open the openable plate 42, it is only necessary to press the lock portion 43 and then locking portion 43 will release from the machine frame 1 by elasticity.

Although the present invention has been described with reference to the preferred embodiments, it will be understood that the invention is not limited to the details described thereof. Various substitutions and modifications have been suggested in the foregoing description, and others will occur to those of ordinary skill in the art. Therefore, all such substitutions and modifications are intended to be embraced within the scope of the invention as defined in the appended claims.

What is claimed is:

1. A protecting device of a computer data-accessing device; wherein the machine frame is installed with a front surface corresponding to the data-accessing device; the front surface has a movable door; pivotal portions are installed at one lateral side of the front surface for being pivotally installed to the machine frame; the frame has a lock for locking the door; therefore, by the pivotal connection of the pivotal portions of the door and the machine frame, one end of the lock is an openable free end;

wherein by the locking relation of the lock and the machine frame; the door can be opened or closed; when the door is opened, the hard disk can be drawn out, and when the door is closed, the hard disk drive will not fall down, and electromagnetic wave will not leak out;

wherein one lateral side of the door has a plurality of extending pieces; at least two extending pieces have pivotal portions at an outer lateral side thereof for being pivotally installed to the machine frame and each of the pivotal portions has a respective nose portion; the pivotal portions are capable of being inserted into inserting holes in the machine frame; and then the nose portions will resist against lower edge of the inserting holes.

2. A protecting device of a computer data-accessing device; wherein the machine frame is installed with a front surface corresponding to the data-accessing device; the front surface has a movable door; pivotal portions are installed at one lateral side of the front surface for being pivotally installed to the machine frame; the frame has a lock for locking the door; therefore, by the pivotal connection of the pivotal portions of the door and the machine frame, one end of the lock is an openable free end;

wherein by the locking relation of the lock and the machine frame; the door can be opened or closed; when the door is opened, the hard disk can be drawn out, and when the door is closed, the hard disk drive will not fall down, and electromagnetic wave will not leak out; and wherein one extending piece is horizontally protruded with a first positioning piece; the first positioning piece is inserted into a connecting hole in the machine frame when the door is closed so that the door will not shake.

3. The protecting device of a computer data-accessing device as claim in claims 1, wherein a control element is locked to the machine frame in advance, the extending piece corresponding to the control element is protruded with a horizontal second positioning piece which extends to a side away from the machine frame; the second positioning piece resists against the control element so that the door will not release along a direction opposite the nose portions.

4. The protecting device of a computer data-accessing device as claim in claim 3, wherein the control element is a screw.

5. A protecting device of a computer data-accessing device; wherein the machine frame is installed with a front surface corresponding to the data-accessing device; the front surface has a movable door; pivotal portions are installed at one lateral side of the front surface for being pivotally installed to the machine frame; the frame has a lock for locking the door; therefore, by the pivotal connection of the pivotal portions of the door and the machine frame, one end of the lock is an openable free end;

wherein by the locking relation of the lock and the machine frame; the door can be opened or closed; when the door is opened, the hard disk can be drawn out, and when the door is closed, the hard disk drive will not fall down, and electromagnetic wave will not leak out;

wherein a fan device is installed at one lateral side of the machine frame, and the fan device is openable for being repaired; the fan device has at least one fan and an openable plate; one side of the openable plate is pivoted to one surface of the machine frame so that the openable plate is opened freely; and wherein one surface of the machine frame installed with the fan device is installed with a receiving chamber for embedding the fan so as to form a flat surface on the machine frame; a bottom of the receiving chamber is formed with a plurality of vents; as a result, wind from the fan will pass through the vents to the machine frame installing the hard disk drive.

6. The protecting device of a computer data-accessing device as claim in claim 5, wherein at a surface of the openable plate facing the receiving chamber is installed with a frame body having the fan; a bottom of the frame body is installed with a positioning portion for fixing the fan; and one surface of the frame body is installed with an elastic hook for preventing the frame body from falling down.

\* \* \* \* \*